United States Patent
Forde et al.

(10) Patent No.: US 6,529,738 B1
(45) Date of Patent: Mar. 4, 2003

(54) WIRELESS COMMUNICATION CHANNEL MANAGEMENT

(75) Inventors: Brian J. Forde, Dublin (IE); Bronagh E. Connolly, Dublin (IE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/501,898

(22) Filed: Feb. 10, 2000

(30) Foreign Application Priority Data

Feb. 26, 1999 (GB) .............................................. 9904348

(51) Int. Cl.[7] .................................................. H04Q 7/00
(52) U.S. Cl. ........................ 455/514; 455/67.1; 455/436
(58) Field of Search ................................. 455/436, 437, 455/439, 513, 514, 67.1, 67.3

(56) References Cited

U.S. PATENT DOCUMENTS

| | | | | |
|---|---|---|---|---|
| 5,530,917 A | * | 6/1996 | Andersson et al. | 455/54.1 |
| 5,737,703 A | * | 4/1998 | Byrne | 455/442 |
| 5,825,757 A | * | 10/1998 | Tat et al. | 370/330 |
| 5,845,192 A | * | 12/1998 | Saunders | 455/436 |
| 5,864,759 A | * | 1/1999 | Tat | 455/437 |
| 6,005,856 A | * | 12/1999 | Jensen et al. | 370/337 |

FOREIGN PATENT DOCUMENTS

| | | | | |
|---|---|---|---|---|
| EP | 0722258 A2 | 7/1996 | | H04Q/7/32 |
| WO | WO9949685 | 9/1999 | | H04Q/7/38 |

\* cited by examiner

*Primary Examiner*—Thanh Cong Le
*Assistant Examiner*—Thuan T. Nguyen
(74) *Attorney, Agent, or Firm*—Dicran Halajian

(57) ABSTRACT

A method and apparatus for maintaining a record of radio signal strength for a plurality of channels in a wireless communication system is provided. A detector detects radio signal strength on each channel, and a memory stores information relating to the detected signal strengths. The information is stored in the form of a value for each channel. Each value is stored in an array and values are stored in the array such that each position in the array is assigned to a particular channel. The use of an array allows stored values to be associated with respective channels by the position that the value is held in.

16 Claims, 2 Drawing Sheets

WIRELESS COMMUNICATION CHANNEL MANAGEMENT

FIELD OF THE INVENTION

BACKGROUND OF THE INVENTION

The present invention relates to a method and apparatus for monitoring radio signal strengths for a plurality of channels in a wireless communication system. In particular, but not exclusively, the present invention relates to such monitoring in a DECT-compliant communications system.

DECT is an abbreviation for Digital Enhanced Cordless Telecommunications to which the European Telecommunication Standard ETS 300 175 relates. Whilst the present invention has particular relevance to DECT-compliant communication systems, and is described hereinafter in relation to such systems, the skilled reader will recognize, however, that the method and apparatus described herein are more generally applicable and compliance with DECT standards should not be assumed unless explicitly stated.

A typical DECT compliant communications system includes at least one Portable Part (PP) which communicates over a wireless link with a radio fixed part (RFP) of a DECT Fixed Part (FP). The fixed part will be connected to other fixed equipment such as a PABX or a PSTN. The FP often includes more than one RFP, with each RFP serving to provide radio coverage of a particular area. The use of multiple RFPs allows large areas of radio coverage and a PP may move from one area covered by one RFP to an area served by another RFP with the same communication facilities being available. DECT PP's commonly take the form of mobile handsets and depending on the implementation of the system, a large number of portable parts may be supported.

Communication between a fixed part and a portable part is provided by so-called 'bearers' which are established on one or more DECT physical channels (channel). Each channel is created by transmitting in one particular slot on one particular radio frequency (RF) channel in successive time division multiple access (TDMA) frames.

According to the DECT standards, when a portable part is activated it is the responsibility of the PP to perform an operation to detect the presence of any nearby RFP's that are in range. This is made possible in a DECT-compliant system because each RFP broadcasts continuously on at least one bearer. Every bearer of a RFP broadcast carries Q-channel information (system information) and N-channel information (identity information). This information is used by the PP to determine if the RFP is one it has access rights to. If the RFP is not involved in supporting a traffic connection with a PP then the N-channel and Q-channel information is broadcast on a so called dummy bearer. If the RFP is involved in supporting one or more traffic connection with one or more PP, the Q-channel and N-channel information is present on each traffic bearer. A RFP supporting at least one traffic connection may drop the dummy bearer, although the broadcast of the N & Q-channel information on the dummy bearer must be restored should all traffic connections with that RFP cease. It is stated for clarity that the N-channel and the Q-channel are logical channels, not DECT physical channels.

Another task of the PP is to identify the RFP transmissions that are received at the PP with the highest detected radio signal strength. The RFP producing these transmissions is also identified and is designated as the strongest RFP. The strongest RFP will normally be the RFP that is closest to the PP and wherever possible communications between the PP and FP will be via the strongest RFP. Useful communication between the PP and the FP may only take place via the chosen RFP if the portable part has access rights to the FP associated RFP.

One procedure for selecting the strongest RFP is for the PP to monitor DECT system channels and build up a list of the channels that have the highest detected radio strength. The channels are included in the list in order of detected radio signal strength, with the channel having the highest detected radio signal strength appearing first.

Once the list has been produced the PP attempts to set up a synchronisation bearer on the channel listed as having the highest radio signal strength. This bearer set up operation is necessary to determine if the detected radio signal strength results from transmissions of a RFP of interest; that is an RFP of a required FP for which access rights will be granted to the PP. Indeed this step is also necessary because the source of the detected radio signals may originate from transmissions of an incompatible system or merely be due to noise. If it can be established from the N-channel and Q-channel information that the transmissions are associated with the required FP, further procedures are conducted allowing the PP to synchronise and lock with the FP and be in a state ready to set up and release traffic bearers in the interest of exchanging traffic (for example voice calls).

If the transmissions are not associated with the required FP the synchronisation bearer is released (if the set up attempt was successful) and the PP attempts to set up a synchronisation bearer on the channel listed as having the next highest detected radio signal strength. Again the PP carries out the steps necessary to determine if this channel carries transmissions from the required FP. This process is repeated until the PP finds a transmission that allows it to synchronise and lock with the required FP. This procedure, however, is not ideal as limits on list size may result in the list not including any entries that are associated with the required FP, as will be described in more detail in relation to FIG. 1 below.

An alternative procedure for selecting the strongest RFP is where the RFP attempts to set up a synchronisation bearer on each DECT channel in turn irrespective of the detected radio signal strength on the channel. This is repeated for each channel until the PP detects transmissions originating from an RFP of an FP it has access rights to. Once such transmissions have been found, the PP must continue searching each DECT channel until it locates a channel carrying transmissions of the same FP but with the highest detected radio signal strength. Such transmissions will generally originate from the closest RFP of the FP of interest and the PP may then conduct further procedures to synchronise and lock with the RFP and be in a state ready to set up and release bearers in the interest of exchanging traffic (for example voice calls).

There are also disadvantages to employing this alternative procedure, including the amount of time required for the PP to reach the state where it is ready to set up and receive traffic bearers, because an attempt to set up the synchronisation bearer would need to be made on every possible DECT channel to guarantee that the required FP and strongest RFP have been identified.

The portable part is also required to keep an ordered list of the DECT channels that have the least activity in terms of the radio signal strength. These so called quietest channels are the ones that will be chosen for supporting traffic bearers when the PP sets up a connection with the FP.

SUMMARY OF THE INVENTION

It is an object of the present invention to provide a method and apparatus for maintaining a record of radio signal strength for a plurality of channels in a wireless communication system, which may be used to facilitate the reliable identification of communication system components without the use of large amounts of memory.

In accordance with one aspect of the present invention there is provided apparatus for maintaining a record of radio signal strength for a plurality of channels in a wireless communication system, the apparatus having:

measuring means for detecting the radio signal strength on each channel; and storage means for storing information relating to the detected signal strengths, wherein the information is stored in the storage means in the form of a value for each channel, each value being representative of the respective detected signal strength on a channel, and the storage means includes an array, with the values being stored in positions in the array such that each position in the array is assigned to a particular channel.

The identity of each channel for which signal strength information is stored can be determined from the storage position in the array because the channel allocation for the various array positions is known. Advantageously, the amount of memory required for storing information relating to a channel can be reduced because there is only the requirement to store information relating to the signal strength of that channel without the need to record information about the channel identity. Another advantage is that because each channel value is recorded in its assigned position, the channels do not need to be sorted in order of detected radio signal strength thus eliminating the need to allocate processing resources to such a task.

The reduction in the amount of memory required for storing information about a given channel makes the storage of information about all DECT channels feasible since a relatively modest amount of storage capacity will be required. This avoids the disadvantages that may result when using a non exhaustive list. Furthermore since the array may contain signal strength information for all DECT channels, the array contains values representing the highest detected signal strengths and the lowest detected signal strengths. Consequently a single array may replace the conventional ordered list of channels having the highest detected radio signal strength and the ordered list of channels having the lowest detected radio signal strength. Preferably (although not exclusively), the array is a two dimensional array. Advantageously the value stored in each position of the array may occupy no more than one byte of storage.

In accordance with another aspect of the present invention there is provided a method of maintaining a record of radio signal strength for a plurality of channels in a wireless communication system, said method comprising the steps of:

detecting the radio signal strength on each channel; and storing information relating to the detected signal strengths, wherein the step of storing information is performed by storing a value for each channel that is representative of the detected signal strength on that channel, the values being stored in positions in an array such that each array position is assigned to a particular channel.

Furthermore, if the wireless communication system of the method is a DECT-compliant communication system, the method may further comprise the steps of:

scanning the array to identify the value representing the highest detected signal strength, setting up a synchronisation bearer on the channel identified as having the value representing the highest detected signal strength; and determining if the measured signal strength arises from transmissions originating from a radio fixed part of a required fixed part, and if the measured signal strength is determined to not arise from such transmissions, releasing the synchronisation bearer and performing the scanning, setting up and determining steps one or more further times only for one or more channels identified as having a value representing one of the next highest detected signal strengths.

Furthermore, if the wireless communication system of the method is a DECT-compliant communication system the method may further comprise the steps of:

scanning the array to identify the values representing the lowest detected signal strengths and selecting one or more of the associated channels for establishing one or more bearer.

Other aspects and optional features of the present invention appear in the appended claims, to which reference should now be made and the disclosure of which is incorporated herein by reference.

BRIEF DESCRIPTION OF THE DRAWINGS

The present invention will now be described by way of example only with reference to the accompanying drawings in which.

DETAILED DESCRIPTION OF THE INVENTION

Before describing the present invention in detail, it will provide useful background to consider the prior art systems and their associated problems in greater depth. As previously mentioned, one procedure for selecting the strongest RFP is for the PP to monitor DECT system channels and build up an ordered list of channel radio signal strengths.

Figure 1:
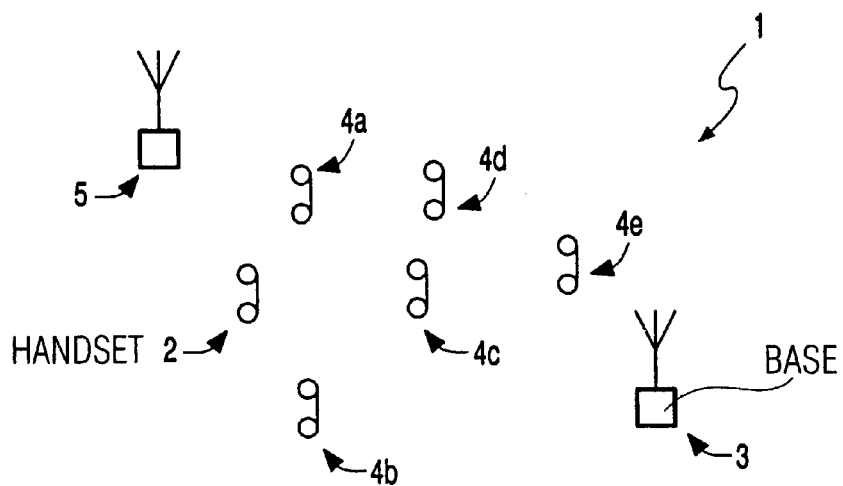
FIG. 1 shows the relative locations of selected components of a typical DECT communications system which may host the present invention.

One problem with this procedure arises when using an ordered list having a number of entries which is fewer than the total number of possible DECT channels. Because each entry relates to a particular channel the number of channels that can be stored in the list is limited and therefore there is no guarantee that any of the channels appearing in the list are being used for transmissions of the required FP. This problem can be understood in one example system with reference to FIG. 1 which shows the relative locations of some components of a wireless communication system in the form of a DECT communication system 1. Consider the situation in which PP2 needs to synchronise and lock with RFP3 of a required FP in order to be ready to make or receive calls. Assuming a number of other PP's 4a, 4b . . . 4e are actively engaged in supporting traffic bearers a number of DECT channels will be carrying the transmissions originating from the PP's 4a, 4b . . . 4e. Because the PP's 4 are closer to the PP2 than RFP3 is to PP2, PP2 may detect a higher radio signal strength for the PP4 transmissions than for transmissions originating from RFP3. If so, the channels associated with the PP4 transmissions will appear in the ordered list above the channel associated with the RFP3 transmissions and indeed the channel associated with the RFP3 transmissions may not appear in the ordered list. Furthermore, RFPs, such as RFP5, that are not connected to the required FP may be closer to the PP2 than RFP3 and the DECT channel associated with transmissions from those RFP's such as RFP5 will appear higher up the ordered list than the DECT channel associated with the transmissions from RFP3.

One possible solution to this problem is to make the ordered list of channels exhaustive so that all DECT channels appear in the list with the loudest first. Unfortunately this can result in the need to use a relatively large amount of memory. This becomes apparent when considering an implementation which requires a minimum of two bytes of memory for each entry in the list. One byte will contain the radio signal strength indicator (RSSI) and the other byte will contain the channel designation. If more than ten standard DECT frequencies are used by the system then the channel designation must be stored in two bytes as there will be more than 256 DECT channels. If the data is being stored in a linked list, then additional bytes are required per list entry to maintain the links. The requirement to sort the channels by received radio signal strength may also require some processing.

The process of setting up traffic bearers on DECT channels featured in the ordered list of quietest channels also has disadvantages if the list contains a limited number of entries. The RFP with which the PP is synchronised and locked can broadcast blind slot information indicating particular channels that should not be used for setting up traffic bearers. If the PP has determined that a number of channels are indeed quiet and therefore potentially suitable for carrying bearers and subsequently the RFP indicates that all of those channels are blind, the PP will be unable to establish a traffic bearer until the quiet channel list is updated.

Figure 2:
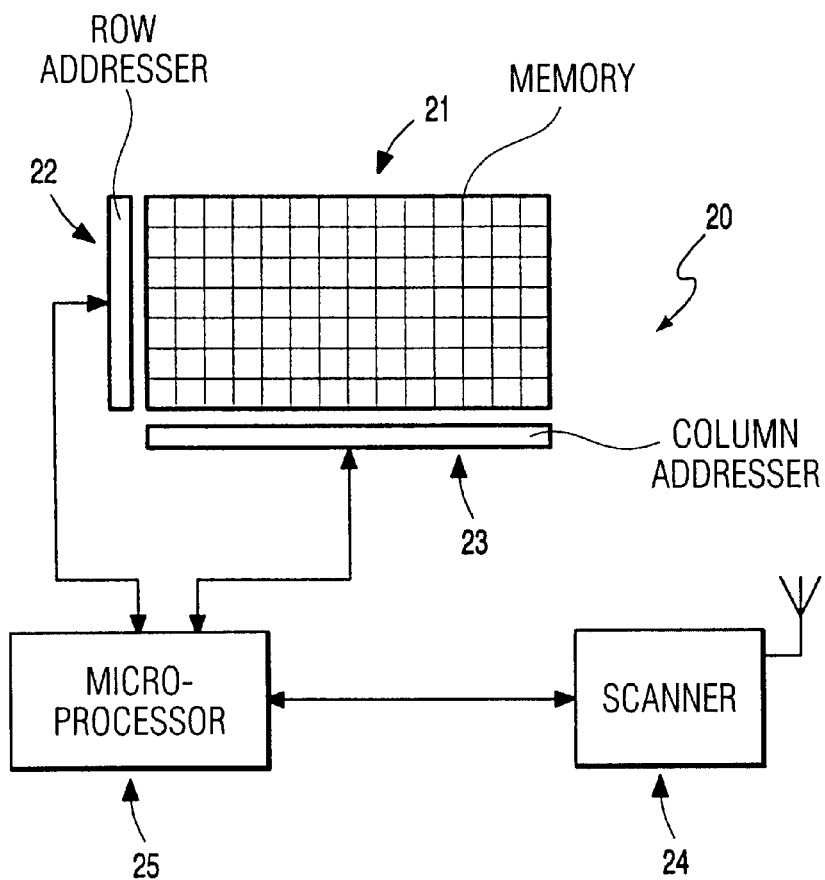
FIG. 2 is a schematic representation of the apparatus of the present invention.
Figure 3:
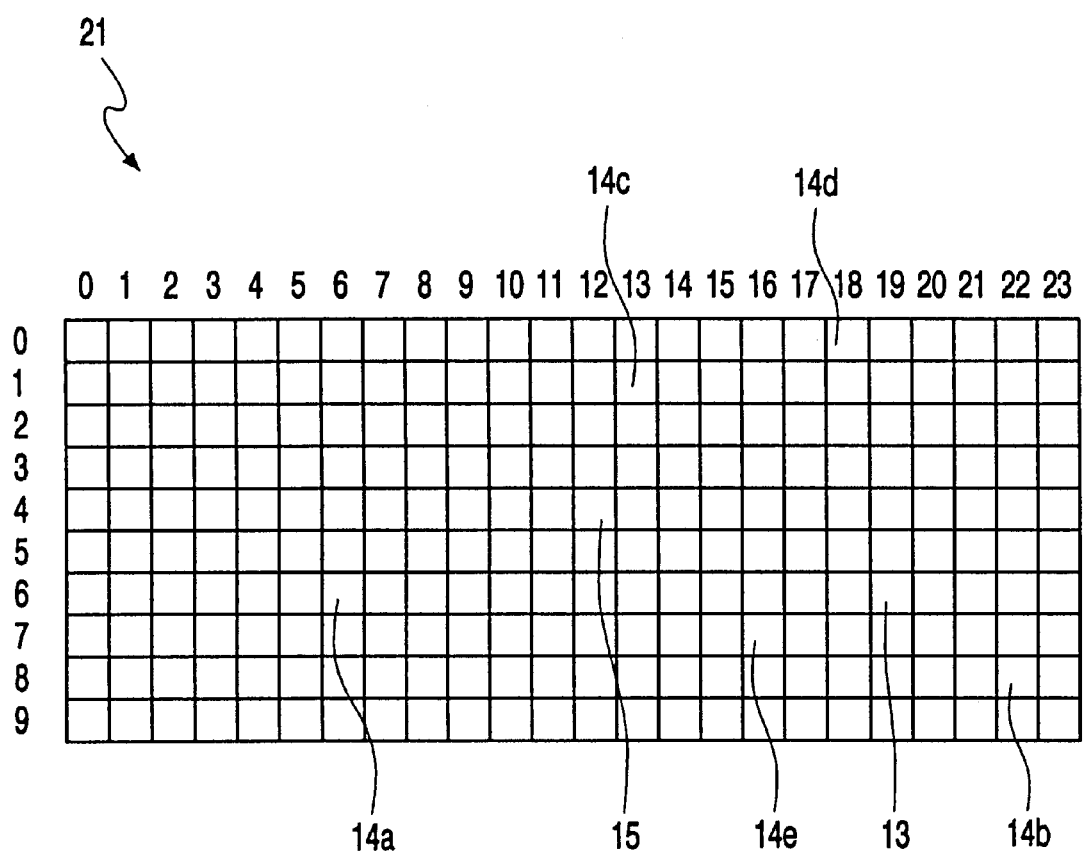
FIG. 3 shows a two dimensional array of a type suitable for use in the present invention.

Turning now to FIG. 2, and embodiments of the present invention, a mobile communications station in the form of DECT portable part (PP) 2 is provided with apparatus 20 for maintaining a record of radio signal strength for a plurality of system channels. The apparatus includes a two dimensional storage array 21 for storing the measured signal strength, row addressing means 22, column addressing means 23, channel scanning means 24 and microprocessor 25. The microprocessor serves to control the scanning 24 and storage 21, 22, 23 means although the apparatus may be designed to function without a dedicated microprocessor and the respective functions thereof handled by other processor capability within the PP as will be apparent to the person skilled in the art. The two dimensional array is represented in more detail in FIG. 3 with each row of the array being assigned to correspond to a DECT frequency channel and each column of the array being assigned to correspond to a DECT time slot.

The portable part 2 scans each DECT channel using the channel scanning means 24 to measure the radio signal strength of each channel as detected at the portable part 2. A DECT physical channel (DECT channel) is defined in terms of a DECT frequency and a DECT time slot. A value relating to the detected signal strength is entered into the array in a particular location which is assigned for each physical channel until a value has been entered for each DECT channel. Because the value for each channel is stored in a respectively assigned location there is no need to store additional information relating to the identity of the DECT channel (this information can be derived from the storage location in the array.) The value stored for each channel can occupy less than one byte of storage space.

Consider the situation where the portable part 2 is attempting to synchronise and lock to a FP that the portable part has access rights to. The PP2 attempts to do this via a RFP of that FP which will also give the best possible radio signal communication. In terms of the general arrangement of FIG. 1, it will be assumed that the required RFP is RFP3 and that RFP5 belongs to a FP that PP2 does not have access rights to. The PP scans each DECT channel in turn to determine the received radio signal strength of each channel and enter a value in the appropriate location of the array 21. If RFP3 is transmitting on the DECT channel occupying slot number 19 of DECT frequency channel number 6, a value representing the received radio signal strength for this DECT channel is entered into location 13 of the array. Similarly if RFP5 is transmitting on the DECT channel occupying slot number 12 of DECT frequency channel number 4, a value representing the received radio signal strength for this DECT channel is entered into location 15 of the array 21. If PPs 4a, 4b . . . 4e are transmitting on DECT channels the resulting received radio signal strengths for those channels will also be represented by values in the appropriate locations of the array. These locations are denoted in FIG. 3 as 14a, 14b . . . 14e, respectively which have been chosen arbitrarily for the present example.

In operation DECT transmissions may be detected by PP2 on others of the DECT channels than the ones chosen for the present example. Indeed the detected radio signal strengths on many channels may correspond to background noise. Radio signal strength may be detected on a channel due to transmissions of a non DECT system or even just noise. On some channels the value detected may not be above the noise floor.

Once a value representing the received radio signal strength has been entered into the appropriate location of the array for each DECT channel, the PP can now begin to detect the RFP that will provide the highest radio signal strength and is connected to a FP to which the PP has access rights. The PP begins by scanning the array to find a value relating to the highest received radio signal strength. The associated channel can be derived from the position in the array and the PP attempts to set up a synchronisation bearer on that channel to determine if the required RFP is indeed transmitting on that channel. If it is established that this is not the case, the synchronisation bearer is released (if the set up attempt was successful) and the selection means scans the array to find a value relating to the next highest received radio signal strength. The PP attempts to set up a synchronisation bearer on the channel associated with this value and the process is repeated for channels having progressively lower detected radio signal strengths until the nearest RFP is found that is part of the required FP. Setting up a synchronisation bearer allows any N-channel and Q-channel information on the DECT channel to be read. The PP may perform further procedures to attain a state where it is in a condition ready to make or receive calls to the fixed part of the system through setting up bearers. It may be desirable to set a condition so that only values representing radio signal strengths above a certain radio signal strength are chosen during scanning.

When the PP requires one or more DECT channels for setting up a traffic bearer the array is scanned for values representing the lowest detected radio signal strengths. The low detected radio signal strengths indicate that these channels are free for use as traffic bearers. The channel associated with these values may be determined from the position of the value in the array. A condition may be set such that only values corresponding to detected radio signal strengths below a certain threshold are selected. Alternatively, the lowest N values may be chosen, where N is a predetermined number.

Once the PP is synchronised and locked on to a RFP, if at any time the RFP indicates that certain slots are blind, then the PP can ignore those slots in the array when selecting a quiet channel. Furthermore, once the PP is indeed synchronised and locked on to a particular RFP, the PP continues to periodically scan each DECT channel to detect the received radio signal strengths of each channel and update the value stored in the array. This is particularly important where the PP is mobile in which case it can move closer to and away from various RFPs which will affect the detected radio signal strength at the PP. Depending on the updated values, the PP may synchronise and lock with a different RFP.

While the present example assigns array rows in order with the individual DECT frequency channel number and array columns with individual time slots this is not a requirement of the present invention and any preferred association of array location with system communication channel may be employed. The array does not need to be a two dimensional array and other arrangements of one dimensional or three dimensional storage arrays could be employed. Although the specific embodiment can store each value representing the received radio signal strength of a channel using no more than one byte of storage, this is not mandatory. A value representing the received radio signal strength of a channel could be stored in an entry having a smaller or larger size and therefore requiring an appropriate amount of storage capacity. An important advantage of the present invention is there is no need to use additional storage capacity for the storage of channel identifier information because this information is implicit from the position of the entry in the array.

Furthermore while the present invention is discussed primarily in relation to a DECT telecommunications system, it will be understood that this is not to be construed as a limitation since the present invention may be employed with other communication systems using multiple predefined system channels.

From reading the present disclosure other modifications will be apparent to the person skilled in the art. Such modifications may involve other features which are already known in the design, manufacture and use of systems and devices and component parts thereof and which may be used instead of or in addition to features already described herein.

What is claimed is:

1. Apparatus for maintaining a record of radio signal strength for a plurality of channels in a wireless communication system, the apparatus having:
   measuring means for detecting the radio signal strength on each channel;
   storage means for storing information relating to the detected signal strengths,
      wherein the information is stored in the storage means in the form of a value for each channel, each value being representative of the respective detected signal strength on a channel, and the storage means includes an array, with the values being stored in positions in the array such that each position in the array is assigned to a particular channel; and
   processor means for identifying a first channel carrying a highest signal strength of said detected signal strengths, determining whether a signal having said highest signal strength is transmitted from a first fixed device that is accessible by setting up a synchronization bearer on said first channel, and selecting a second channel of said plurality of channels having a lowest signal strength of said detected signal strengths for communication with said first fixed device when said first fixed device is accessible.

2. Apparatus in accordance with claim 1 wherein the array is a two dimensional array.

3. Apparatus in accordance with claim 1 wherein the value stored in each position occupies no more than one byte of storage capacity.

4. Apparatus in accordance with claim 1, wherein the processor means further identifies values representing the next highest detected signal strengths with respect to the highest detected signal strength.

5. Apparatus in accordance with claim 1, wherein the processor means further identifies values representing the next lowest detected signal strengths with respect to the lowest detected signal strength.

6. A DECT-compliant portable part suitable for establishing communication with a DECT-compliant fixed part having at least one radio fixed part, wherein the DECT-compliant portable part is provided with the apparatus of claim 1.

7. A DECT-compliant communications system having at least one DECT-compliant portable part of claim 6.

8. A method of maintaining a record of radio signal strength for a plurality of channels in a wireless communication system, said method comprising the steps of:
   detecting the radio signal strength on each channel;
   storing information relating to the detected signal strengths,
      wherein the step of storing information is performed by storing a value for each channel that is representative of the detected signal strength on that channel, the values being stored in positions in an array such that each array position is assigned to a particular channel;
   identifying a first channel carrying a highest signal strength of said detected signal strengths;
   setting up a synchronization bearer on said first channel to determine whether a signal having said highest signal strength is transmitted from a fixed device which is accessible by a portable device; and
   selecting a second channel of said plurality of channels having a lowest signal strength of said detected signal strengths for communication with said fixed device when said fixed device is accessible by said portable device.

9. A method in accordance with claim 8 wherein the wireless communications system is a DECT-compliant communication system, said method further comprising the step of selecting a signal having a next lowest signal strength for establishing one or more bearer when said first channel is marked as being blind or busy.

10. A communication system comprising:
   a plurality of fixed devices; and
   a plurality of portable devices for communication with at least one of said plurality of fixed devices using at least one of a plurality of channels;
   wherein at least a first portable device of said plurality of portable devices comprises:
      a detector that measures signal strengths on said plurality of channels;
      a memory that stores said signal strengths in positions of an array; said positions being indicative of particular channels of said plurality of channels; and a processor configured to scan said array to identify a first channel carrying a highest signal strength of said signal strengths, determine whether a signal having said highest signal strength is transmitted on said first channel from a first fixed device of said plurality of fixed devices that is accessible by said first portable device by setting up a synchronization bearer on said first channel, and select a second channel of said plurality of channels having a lowest signal strength of said signal strengths for communication with said first fixed device when said first fixed device is accessible by said first portable device.

11. The communication system of claim 10, wherein said processor is further configured to ignore said second channel when said first fixed part indicates that said second channel is blind, and select a third channel of said plurality of channels having a next lowest signal strength of said signal strengths for communication with said first fixed device.

12. The communication system of claim 10, wherein said processor is further configured to identify a next highest signal strength of said signal strengths when said first fixed device is not accessible by said first portable device.

13. A method for communicating between and a portable device and at least one of a plurality of fixed stations of a communication system; said method comprising the following acts performed by said portable device:

measuring signal strengths on said plurality of channels;
storing said signal strengths in positions of an array; said positions being indicative of particular channels of said plurality of channels; and identifying a first channel carrying a highest signal strength of said signal strengths;

determining whether a signal having said highest signal strength is transmitted from a fixed device which is accessible by said first portable device by setting up a synchronization bearer on said first channel; and selecting a second channel of said plurality of channels having a lowest signal strength of said signal strengths for communication with said fixed device when said fixed device is accessible by said first portable device.

14. The method of claim 13, further comprising ignoring said second channel when said fixed part indicates that said second channel is blind; and selecting a third channel of said plurality of channels having a next lowest signal strength of said signal strengths for communication with said fixed device.

15. The method of claim 14, further comprising identifying a next highest signal strength of said signal strengths when said fixed device is not accessible by said first portable device.

16. The method of claim 13, further comprising identifying a next highest signal strength of said signal strengths when said fixed device is not accessible by said first portable device.

* * * * *